United States Patent
Paoluccio et al.

(10) Patent No.: US 7,479,221 B2
(45) Date of Patent: Jan. 20, 2009

(54) CATCH BASIN FILTER ABSORBER APPARATUS FOR WATER DECONTAMINATION

(76) Inventors: John A. Paoluccio, 3530 Kiernan La., Modesto, CA (US) 95356; John J Paoluccio, 4801 Quintum La., Modesto, CA (US) 95356

( * ) Notice: Subject to any disclaimer, the term of this patent is extended or adjusted under 35 U.S.C. 154(b) by 136 days.

(21) Appl. No.: 11/535,010

(22) Filed: Sep. 25, 2006

(65) Prior Publication Data
US 2008/0073277 A1    Mar. 27, 2008

(51) Int. Cl.
*E03F 5/06* (2006.01)
(52) U.S. Cl. .................... 210/163; 210/164; 210/282; 210/284; 210/290
(58) Field of Classification Search ......... 210/163–164, 210/282–284, 290
See application file for complete search history.

(56) References Cited

U.S. PATENT DOCUMENTS

| | | | | |
|---|---|---|---|---|
| 4,519,918 A | * | 5/1985 | Ericsson et al. | 210/680 |
| 5,622,630 A | * | 4/1997 | Romano | 210/683 |
| 5,820,762 A | * | 10/1998 | Bamer et al. | 210/661 |
| 5,980,740 A | * | 11/1999 | Harms et al. | 210/162 |
| 6,080,307 A | * | 6/2000 | Morris et al. | 210/163 |
| 6,368,499 B1 | * | 4/2002 | Sharpless | 210/164 |
| 2003/0127380 A1 | * | 7/2003 | Morris et al. | 210/164 |
| 2003/0146164 A1 | * | 8/2003 | Robson et al. | 210/693 |
| 2004/0094461 A1 | * | 5/2004 | Sharpless | 210/163 |
| 2004/0226869 A1 | * | 11/2004 | McClure et al. | 210/163 |
| 2006/0096910 A1 | * | 5/2006 | Brownstein et al. | 210/490 |

* cited by examiner

*Primary Examiner*—Chester T Barry
(74) *Attorney, Agent, or Firm*—Robert S. Smith

(57) ABSTRACT

A storm water treatment device that is installed under the grate of new or existing catch basins, and more commonly referred to as an insert. The catch basin decontamination apparatus has a universal housing and support ring that allows one design to fit most applications. Adjustable chains allow for proper position below grate and a semi-flexible molded or rigid deflector directs incoming drain water to the housing. A slip-on filter/absorber cartridge fits over a perforated drain tube, in the center of the housing, allowing the drain water to first pass through the filter/absorber media before exiting through the drain tube and out the bottom of the housing. The filter/absorber cartridge includes a variety of absorber materials that absorb oil and repel water. Activated carbon, microbes and other site specific absorbents can be used in the replaceable slip-on cartridge. A leaf pre-strainer helps prevent leaves and debris from entering the housing. A clean in place suction tube and clod buster form of the apparatus aids in cleaning the housing.

39 Claims, 9 Drawing Sheets

CATCH BASIN FILTER ABSORBER APPARATUS FOR WATER DECONTAMINATION

FIELD OF THE INVENTION

The invention has particular application to methods and apparatus for protecting the environment and particularly to the pollution associated with the runoff from paved surfaces. Increased development and the associated increase in roads, parking lots and paved areas leads to increased accumulation of pollutants, such as sediment from aerial deposition and landscaping, oil, grease and anti-freeze from leaky vehicles, pesticides, as well as oil and hydrocarbons and chemicals from buildings, landscaping and other activities. More particularly, the invention relates to apparatus and methods for separating contaminants from such runoff at individual catch basins.

Rainfall on roads & parking lots washes these accumulated pollutants to the rainwater catch basin drains, particularly during the first-flush events. A first flush event involves the runoff from the first rain after a period without rain. This runoff carries a relatively larger amount of pollutants from the air and paved surfaces. For example, hydrocarbons collect on the roadway surfaces over many months. During the first rains, after a period without rain, the oil and other hydrocarbons, that are lighter than water, quickly move from the pavement surface and form an oily sheen that move with rainwater down a catch basin. The catch basin, also known as a storm drain inlet or curb inlet, is an inlet to the storm drain system. The contaminated water then drains to soil absorption systems such as dry wells, recharge basins, and other watersheds.

This water may end up in waterways such as streams, bays or groundwater. The contaminants clog drainage systems and contaminate groundwater. This problem has resulted in contaminating drinking water sources across the United States making some sources unusable. Municipal water supplies have installed very costly filtration and treatment systems to try and remove these contaminants before distributing cleaned water to homes and businesses.

BACKGROUND OF THE INVENTION

The prior art includes numerous prior art catch basin constructions. Some of these include inserts that range from simple geo-textile sheets placed at the grate opening to complex structures that include large water storage, various filters and grates.

The prior art structures have not been wholly satisfactory. Many prior art catch basin inserts are difficult to install and service. Many claim the use of absorbents but in practice they include a sock with absorbent material and only a small amount of hydrocarbons are captured from the drain water. Developed areas, such as malls or housing developments may have half a dozen sizes, shapes and types of catch basin inlets and the project ends up with a variety of inserts that make service difficult. Many of the prior art units quickly become ineffective because the filter strainer becomes plugged and most of the drain water overflows the unit and enter the storm drain system un-treated. Due to the great number of grate types and sizes including round, rectangular and square with various grate support frames, installation of inserts involves great expense and frequent failures occur. Most Inserts are supported from the catch basin frame with custom fabricated sheet steel formed to inset under the grate frame. This requires accurate measurements for each size and results in high costs that discourage installation.

SUMMARY OF THE INVENTION

It is an object of the present invention to protect groundwater by reducing the hydrocarbons and chemicals that enter through storm drains and catch basins by using an improved Catch Basin Insert. More particularly, it is an object of the present invention to prioritize the reduction of reducing hydrocarbons and chemicals so that greater emphasis is assured with respect to the first runoff water (the first flush water) after the initiation of runoff. Thus, the most seriously contaminated runoff is emphased by the process and apparatus.

Another object of this invention is to provide substantial improvements over the prior water treatment patents of John A. Paoluccio. These include U.S. Pat. No. 4,555,201 Sediment Dike Apparatus and Methods dated Nov. 26, 1985 and Sediment Dike with Absorber Apparatus U.S. Pat. No. 5,573, 349 dated Nov. 12, 1996. The disclosure thereof is incorporated herein by reference. A particular insert version of the latter patent has been very successful in capturing contaminants from storm water run-off through catch basins. Although this prior art version has been very effective it is an object of the present invention to provide substantial improvement that simplify manufacturing and installation, reduce costs, improve effectiveness and speed up service and absorber cartridge replacement and disposal.

It has now been found that these and other object to the present invention may be attained in a filtration apparatus for mounting in an associated catch basin for receiving associated runoff water which includes a housing, the housing having a top and a bottom, the bottom having an outlet for discharging a liquid. At least a first suspension member has a first axial extremity for attaching to a wall of the associated catch basin and a second axial extremity for attaching to the housing. A filtration media is disposed in the housing and disposed to cause liquid in the housing to pass through the filtration media before passing out of the outlet and the housing has an overflow that allows passage of liquid entering the housing, at a rate that is greater than a predetermined rate, to bypass the filtration media.

In some forms of the apparatus the filtration apparatus has a filtration media that includes one or more absorbents. The apparatus may include a deflector for directing associated runoff water into the housing as well as a tubular member for delivering a vacuum from an associated device to break up clods in the apparatus. The tubular member may be dimensioned and configured for receiving pneumatic pressure from a highway service truck.

At least one suspension member may be flexible and may be a chain. The apparatus may be dimensioned and configured to prolong the passage of fluid through the housing to allow sediment and debris to settle to the bottom of the housing. The filtration media may be layered and may comprise a plurality of different materials. In some cases, at least one of the upper layers is a cellulose based sorbent. Other layers may be polypropylene and activated carbon.

Various forms of the present invention utilized a cartridge that has a central bore. The cartridge may include a centrally disposed tube and this tube may have at least an axial part thereof that is perforate.

Other forms of the invention include filtration apparatus for decontaminating runoff water from a plurality of catch basins which includes an interceptor tank to collect the runoff water, a containment tank for treatment of runoff water, a plurality of modular filter/absorber cartridge assemblies disposed in the containment tank, a float operated sump pump disposed in the interceptor tank for directing runoff water from the interceptor tank to the containment tank, and a drain conduit extending from the containment tank to discharge treated runoff water. This embodiment of the present invention may include outlets of each of the modular filter/absorber cartridges communicating with a single drain conduit.

The invention also includes the method for decontamination of runoff water which insures that the decontamination of first flush runoff water is more comprehensive than for subsequent runoff water which includes providing a filter/absorber chamber having an overflow bypass, directing runoff water to the chamber, providing filtration and absorption steps on at least the initial runoff water; and in the event more extensive runoff water passing the chamber allowing that water to bypass the filtration and absorption steps.

One form off the decontamination apparatus includes a housing having an inside and an outside defined by an open top, closed sides and a closed bottom, an elongated standpipe disposed in the housing with a fluid tight connection to the bottom so that the interior of the standpipe is in fluid communication with the outside of the housing to define an outlet from the standpipe, the standpipe having openings therein allowing fluid communication into the standpipe, a cartridge dimensioned, configured and disposed in the housing to cause liquid entering the open top of the housing to flow through the cartridge, the cartridge including at least one of the materials selected from the group consisting of an adsorbent and a filter material whereby liquid flow into the housing will pass through the cartridge into the standpipe and out the outlet.

The cartridge may surround the standpipe and may be substantially cylindrical and have a center bore that is substantially concentric with the standpipe as well as being disposed in abutting relationship to the standpipe. The cartridge may include a cartridge pipe extending through the cartridge and the cartridge pipe may be substantially concentric with the standpipe. The cartridge pipe may include a plurality of openings and an axial portion thereof proximate to the cartridge. The cartridge pipe may have an axial part thereof that extends above the cartridge and that axial part may include weep slits, whereby fluid sitting in the housing at a higher elevation than the top of the cartridge will be drained through the outlet.

The multiple materials in the cartridge may be disposed in the cartridge in respective layers at different elevations and the cartridge may include an outer porous sock enclosing all of the materials therein.

The invention also includes a runoff water decontamination apparatus for installation in associated catch basin which includes a module as described above and, the module has a peripheral lip thereon, a collar dimension and configured to engage the peripheral lip, at least a first suspension member for engaging the collar to suspend the module in an associated catch basin. The flange made being disposed proximate to the top of the module.

The runoff water decontamination apparatus may further include a suction tube extending into the cartridge and above the module that is dimensioned and configured for engaging an associated service truck that vacuums sediment from the module. The apparatus may further include a member mounted for reciprocal movement to direct a vacuum to the contents of the module. The tubular member may be dimensioned and configured to move and to cooperate with an associated service truck. The upper axial extremity of the standpipe may be threaded to facilitate movement of the module. The the first suspension member may be a first chain and the apparatus further includes a second suspension member that is a second chain. The first and second chains may engage the collar at substantially opposite parts thereof.

Still another form of the present invention is a runoff water decontamination apparatus for receiving runoff water from a plurality of associated catch basins which includes an interceptor tank, a treatment tank receiving runoff water from the interceptor tank, a plurality of modules as described above disposed in in the treatment tank; and the outlet of each of the modules being directed to a common place.

The outlet of each of the modules may be directed through a common pipe and the apparatus may further include a pump for moving runoff water from the interceptor tank to the treatment tank.

The invention also includes the method for decontamination of runoff water which includes providing a housing having an inside and an outside defined by an open top, closed sides and a closed bottom, an elongated standpipe disposed in the housing with a fluid tight connection to the bottom so that the interior of the standpipe is in fluid communication with the outside of the housing to define an outlet from the standpipe, the standpipe having openings therein allowing fluid communication into the standpipe, a cartridge dimensioned, configured and disposed in the housing to cause liquid entering the open top of the housing to flow through the cartridge, the cartridge including at least one of the materials selected from the group consisting of an adsorbent and a filter material whereby liquid flow into the housing will pass through the cartridge into the standpipe and out the outlet.

BRIEF DESCRIPTION OF THE DRAWING

The invention will be better understood by reference to the accompanying drawings in which.

DESCRIPTION OF THE PREFERRED EMBODIMENTS

Storm drains and storm sewers are designed to drain excess rain and ground water from paved streets, parking lots, sidewalks, and roofs. Storm drains vary in design from small residential dry wells to large municipal systems. They are present on most motorways, freeways and other busy roads, as well as towns in areas which experience heavy rainfall, flooding and coastal towns which experience regular storms.

Most drains have a single large exit at their entrance (often covered by a grate or a grating to prevent access by humans and exit by debris) into either a canal, river, lake, reservoir, sea or ocean and spread out into smaller branches as they move up into their catchment area. Small storm drains may discharge into individual dry wells. Storm drains may be interconnected using slotted pipe, to make a larger dry well system. Storm drains may discharge into man-made excavations known as recharge basins.

Building codes vary greatly with respect to the handling of storm drain runoff. New developments might be required to construct their own storm drain processing capacity for returning the runoff to the water table and bioswales may be required in sensitive ecological areas to protect the watershed.

Figure 1:
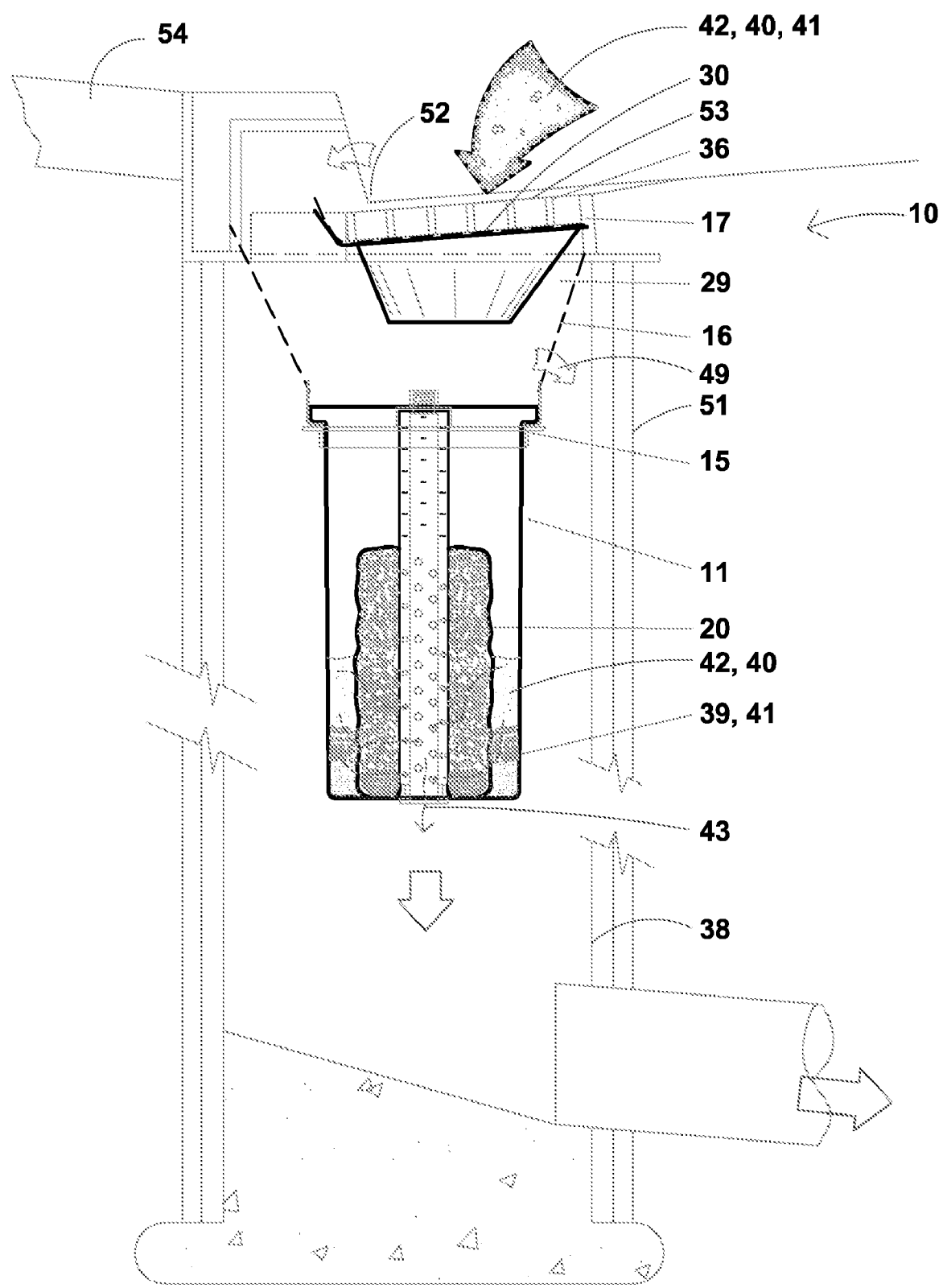
FIG. 1 is a schematic cross section view of a first embodiment of the present invention in the form of an insert installed in a typical catch basin.
Figure 2:
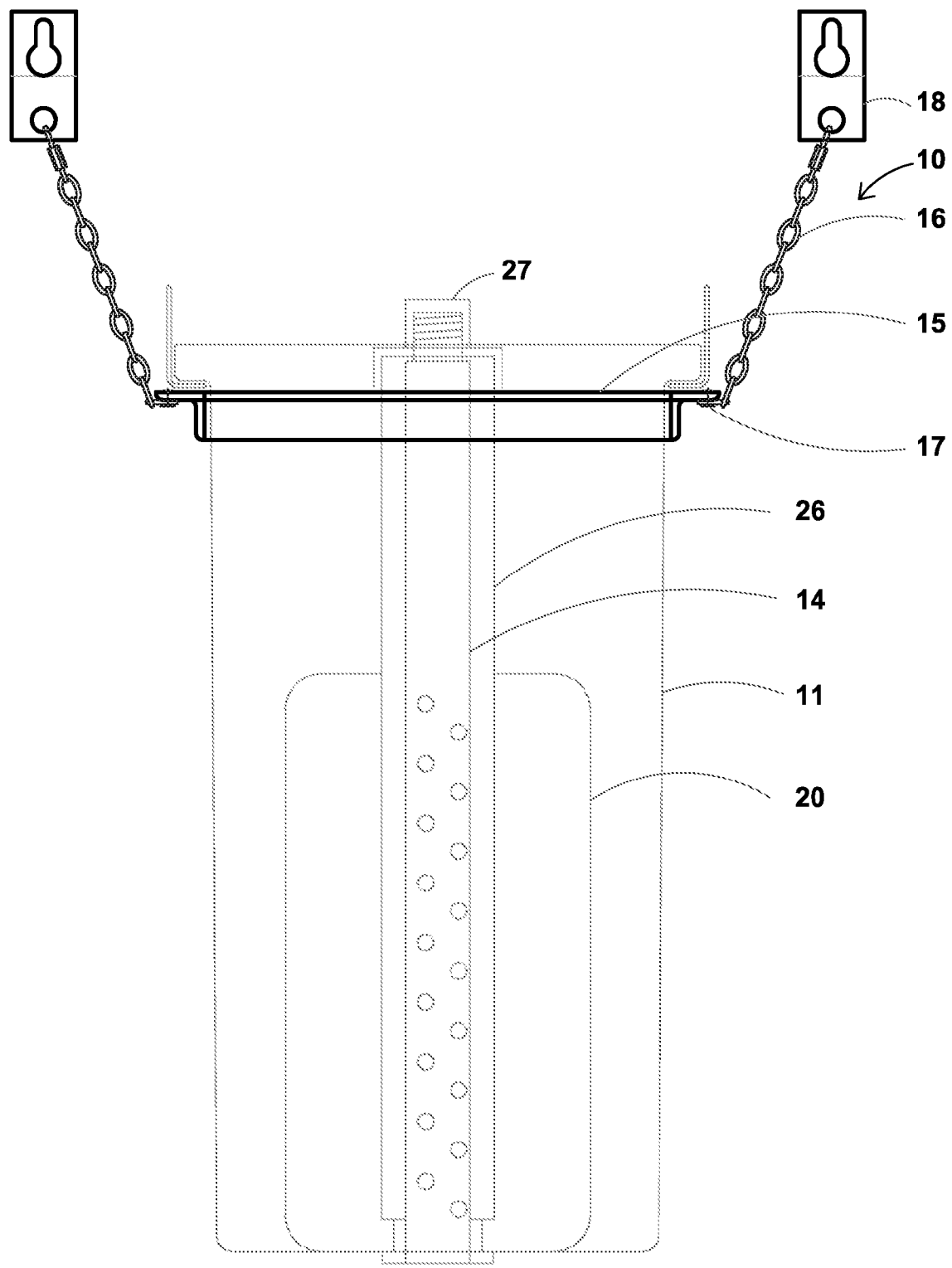
FIG. 2 is a schematic view of the support angle ring system with adjustment chains that fits round, rectangular and most other catch basin types to accept our universal housing assembly.
Figure 3:
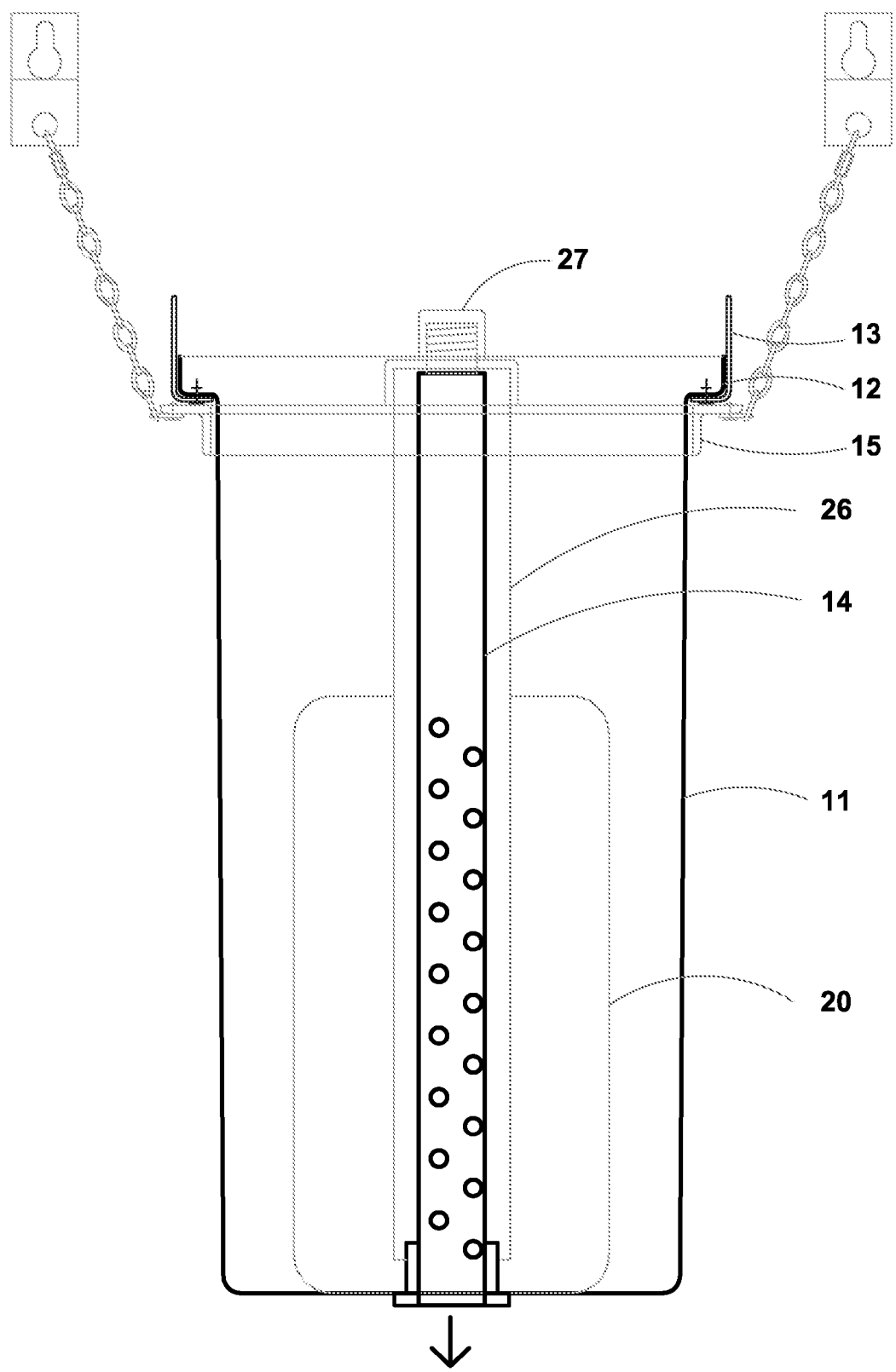
FIG. 3 is a schematic view of the universal housing assembly with fixed 2" perforated drain tube.

Referring now to FIGS. 1-8D there is shown a first embodiment of a catch basin decontamination apparatus or insert 10 in accordance with one form of the present invention. The decontamination apparatus 10 is intended for insertion into an existing catch basin 51 as best shown in FIG. 1. The catch basin 51 is disposed, for example, at the gutter 52 of any highway 53 adjacent to the curb 54. Typically a grate 36 is a part of the catch basin 51. Thus, dirty runoff water 42 is directed by gravity from the sloping highway 53 and the curb 54 into the catch basin grate 36. The apparatus 10 includes a housing 11 that is generally cylindrical. In one form of the first embodiment the housing is manufactured of High Density Polyethylene HDPE and has a nominal 16 gallon capacity.

In a typical urban system run-off water 42 flows through a leaf pre-strainer 30 in a grate 36. A truncated conical deflector 29 directs the runoff water 42 into the open top of the housing 11 where sediment and debris can settle. As runoff water 42 flows into the catch basin, the water level in the housing 11 rises and water flows through a filter/absorber cartridge 20. A perforated 3" internal drain tube 26 extends axially through, and is part of, the slip-on Filter/Absorber Cartridge 20. The perforated 3" diameter internal drain tube 26 is concentric with the smaller 2" diameter drain tube 26 that is fixed to the bottom of the housing 11.

The perforated 2" drain tube 14 is fixed to the housing and is not removed. This allows the 3" diameter perforated tube 26 within the cartridge 20 to easily slip over the 2" fixed tube 14. Typically there is a radial clearance of approximately ½" intermediate the tube 26 and the tube 14.

A typical embodiment of the slip-on cartridge 20 includes a filter absorber cartridge portion that is approximately 10 inches in diameter and 18 inches high. A 3" diameter perforated drain tube 26 in the center of the cartridge 20 extends vertically to a height that matches the height of the 2" fixed drain tube 14 in the housing.

Figure 4:
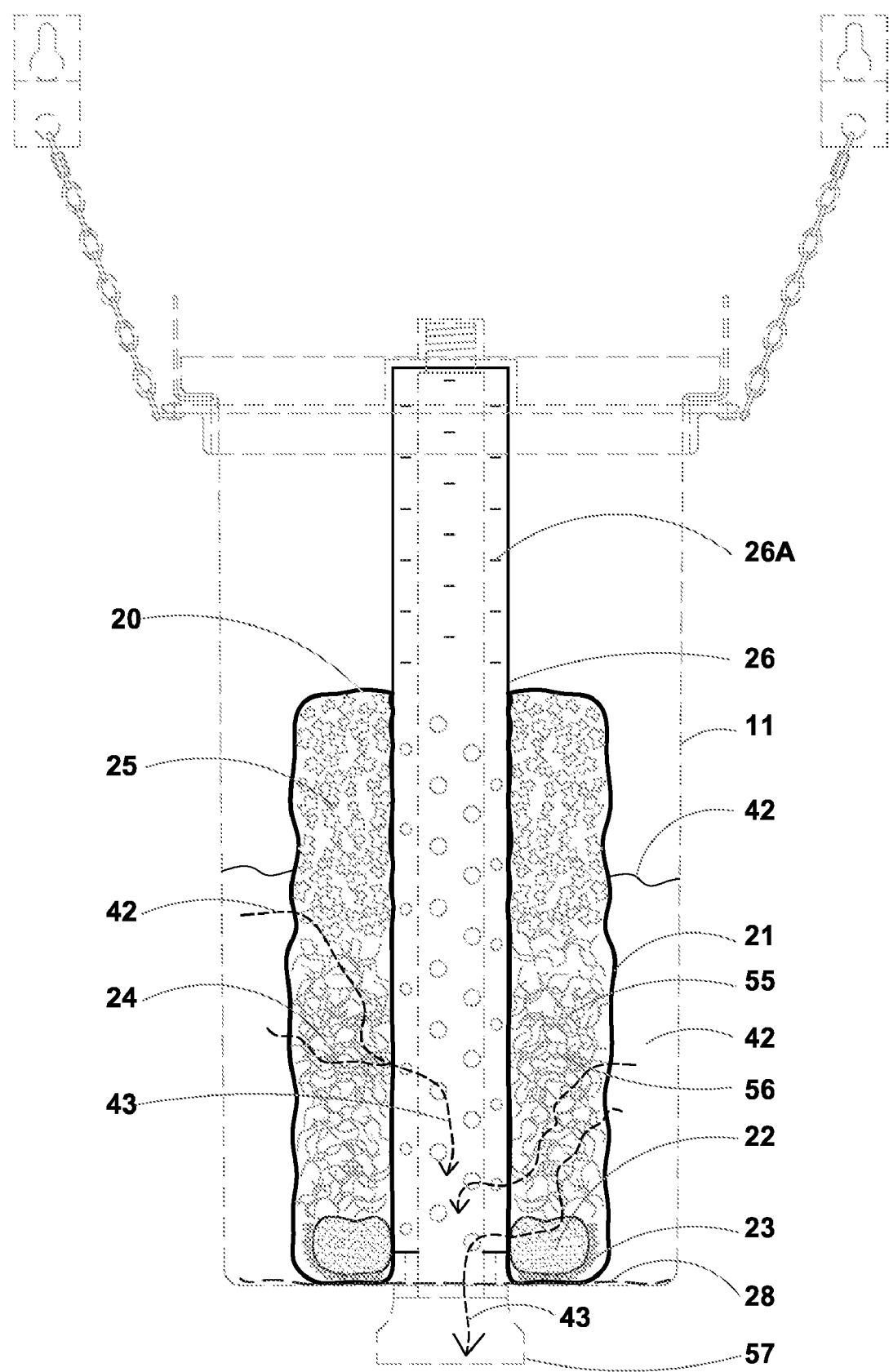
FIG. 4 is a schematic view of the filter/absorber cartridge with extension tube. This shows a cross section through the filter/absorber slip-on cartridge showing the different layers of absorber material and the 3" perforated drain tube that slips over the permanent 2" perforated drain tube fixed at the housing.
Figure 5A:
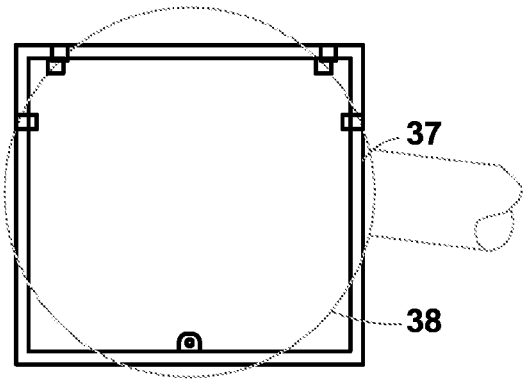
FIG. 5A is a top schematic view of the catch basin with grate removed.
Figure 5B:
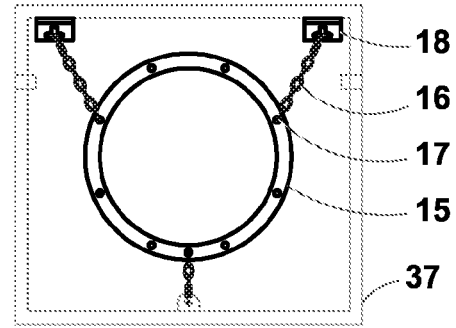
FIG. 5B is a top schematic view of the installed universal support ring and chains.
Figure 5C:
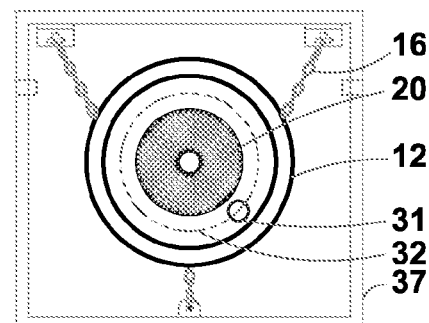
FIG. 5C is a top schematic view of the housing installed in the support ring.
Figure 5D:
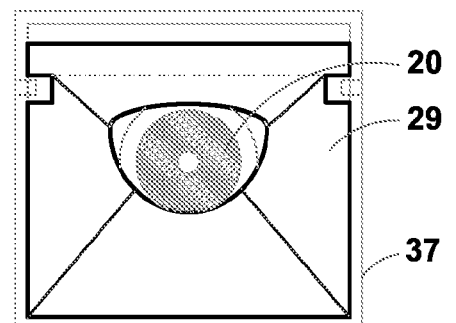
FIG. 5D is a top schematic view of the installed deflector.
Figure 5E:
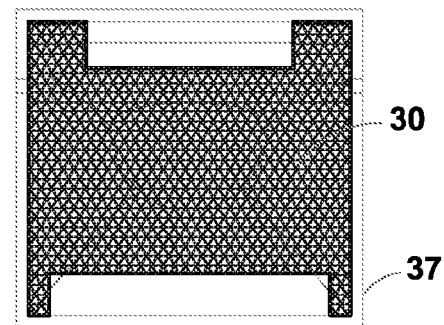
FIG. 5E is a top schematic view of the installed leaf prestrainer.
Figure 5F:
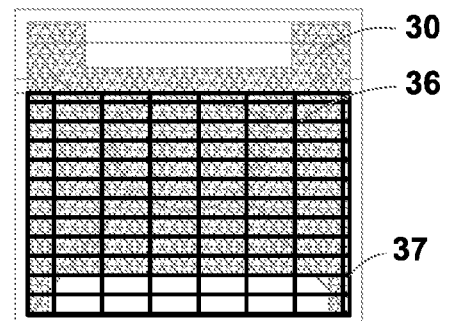
FIG. 5F is a top schematic view of the catch basin with the grate installed on the top thereof.
Figure 6:
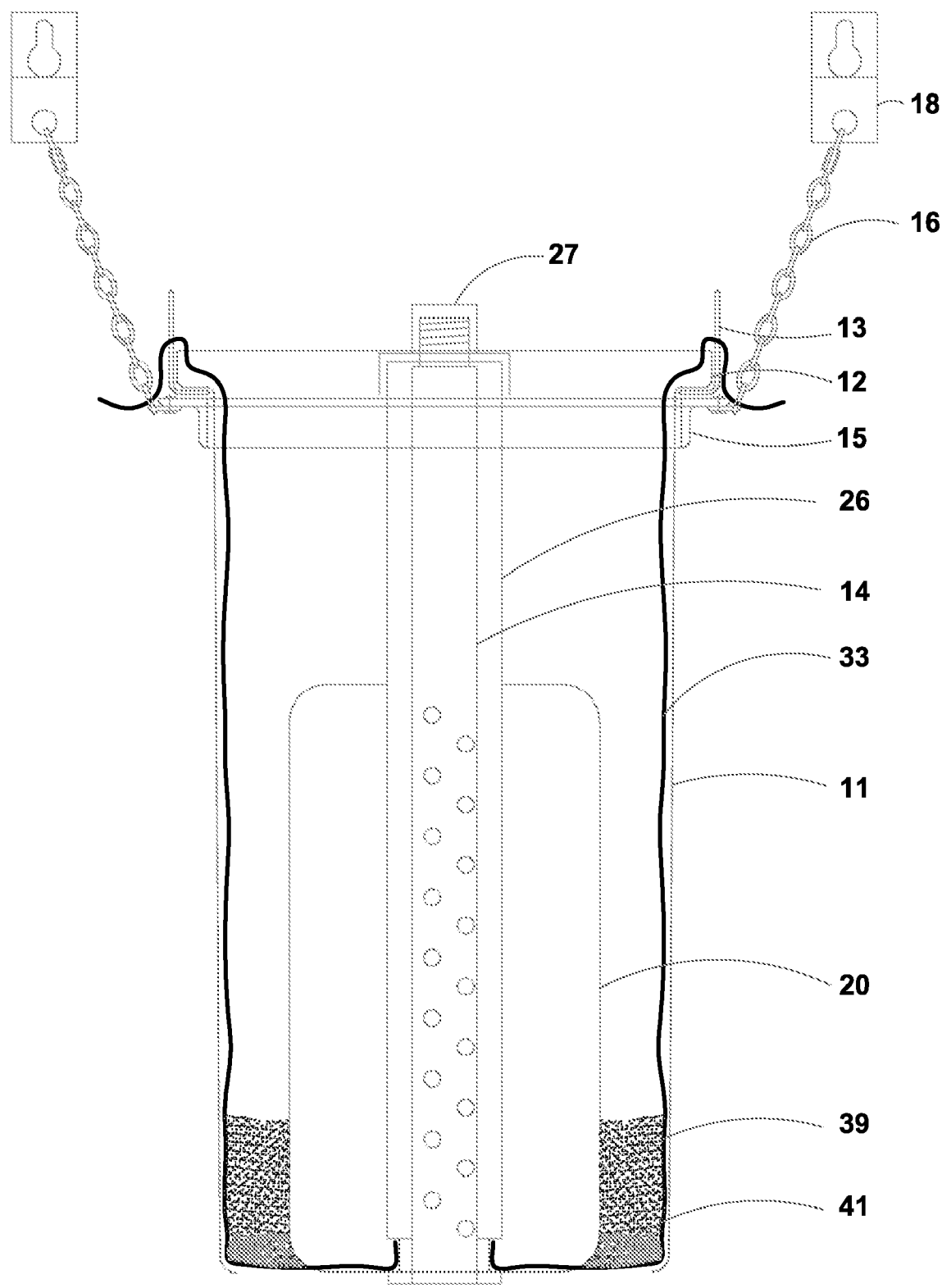
FIG. 6 is a schematic view of an optional liner inside the housing. The liner may be used to remove sediment from the housing while the housing remains in place.

The run-off water 42 flows in the housing 11 through one or more generally horizontal layers of absorber media 22, 23, 24, 25 as best seen in FIG. 4. The absorbent material 24, 25 also acts like a deep bed filter, thereby being capable of capturing a larger volume of sediment, fines and hydrocarbons before plugging up. The filter absorber cartridge 20 includes activated carbon 22, located at the lower portion of the filter absorber cartridge 20, that acts to capture more chemicals and hydrocarbons. Typically the absorbent layers are disposed in a sock or polyester fabric strainer 21. In a typical application the filter absorber cartridge 20 will weigh approximately 5 pounds at the time of installation and before absorbing any liquids. The outer cartridge layer is a polyester fabric strainer 21 that blocks the larger solids and debris.

The primary absorbent media 25 is made from recycled forest products in a proprietary manner and is safe for the environment. It is a cellulose based sorbent 25 particulate called Absorbent W™ and offers the least resistance to flow. The volume of this material is approximately 0.30 cubic feet and is located in the upper portion of the cartridge. This material is manufactured by Absorption Corp. having an address of 1051 Hilton Ave, Bellingham, Wash. 98225. The media 24 is fine fiber polypropylene sorbent. For some applications a mixture of fines and layers is preferred to allow channels for deep bed filtration and absorption. The preferred embodiment of the filter absorber cartridge 20 has a layer of this material that is approximately 0.4 cubic feet.

The cartridge 20 includes layers of polypropylene 24 and other oil absorbing absorbent fiber material is also used along with activated carbon 22. The absorbent materials 22, 23, 24, 25 types can be changed or modified to accommodate site-specific conditions. The spent filter/absorber cartridge 20 may be inexpensively disposed of by incineration.

In operation, storm drain directed liquid and entrained matter including first-flush event water 42 is directed into the housing 11 assembly by a deflector 29 that inherently must be unique to the particular catch basin construction and installation.

During the operation of the system in accordance with the present invention the sediment and heavy solids tend to settle to the bottom of the HDPE housing 11. As the runoff water 42 starts to rise in the housing 11, the runoff water drains through the vertical filter/absorber cartridge 20. As the dirty water passes through the porous absorbents 22, 23 24, 25, it is progressively cleaned. The water enters the cartridge horizontally but tends to flow on a downward slope path through the absorbent materials. The absorbent materials 22, 23, 24, 25 also act as a deep bed filter. More specifically, as the dirty water passes through the slip-on filter/absorber cartridge 20 hydrocarbons are captured. The treated water 43 then passes through a 3" perforated drain tube 26 axially disposed in the center of the cartridge 20 and then through the fixed 2" perforated drain tube 14 that is fixed to the bottom of the housing 11. The treated water 43 then flows to the storm drain piping system or dry well.

As the slip-on filter/absorber cartridge 20 becomes saturated and plugged with hydrocarbons, sediment, chemicals and other pollutants, the water level rises in the housing 11, thereby directing the water to a cleaner upper portion of absorber material 22, 23, 24, 25. This puts all of the absorber material to work for maximum efficiency. Foam, polyethylene or poly filter pads 28 between the filter absorber cartridge 20 and the bottom of the housing 11 helps to slowly drain standing water at the bottom of the housing 11 due to small openings between the 2" drain tube and the bottom of the housing. In addition, small weep holes in the 3" drain tube 26 above the cartridge absorber portion drain any standing water above the cartridge absorber materials, if the material is plugged, to pass out the outlet at the bottom of the 2 inch perforated drain tube 14 that is fixed to the housing 11.

Leaf pre-strainers 30 at the grate 36 help keep leaves, grasses and large debris from entry into the housing 11. The leaf pre-strainers 30 have overflow features to allow flow if the strainer 30 becomes plugged. These should be checked and cleaned prior to major rains and after leaf fall.

To facilitate mounting of the apparatus in accordance with the present invention in a wide variety of catch basin sizes and shapes, the present invention utilizes a stainless steel support angle ring 15 that allows the housing to be securely held in place. The ring 15 has a slightly larger internal diameter than the outside diameter of the housing 11 to permit slipping the housing 11 therein.

In some embodiments the ring 15 is manufactured of stainless steel and includes a stainless steel angle ring having dimensions of 1½×1½×3/16" thick type 304 stainless steel angle flange rolled leg out to 14 3/16" ID. Punched with (8) 7/16" diameter holes on a 16" diameter bolt circle. First and second chains 16, 16 engage opposed sides of the ring 15. Respective opposite axial extremities of the chains 16, 16 are supported by first and second brackets 18, 18 engaging the wall of the catch basin. Those skilled in the art will understand that variations in the length of the respective chains will accommodate a wide variety of catch basin shapes and sizes.

The absorber materials in the cartridge 20 may remove up to 70% or more of the hydrocarbons and sediment passing through the cartridge 20 at heavy concentrations. However, like most catch basin insert treatment devices, they are commonly rated at much lower efficiencies due to the great number of variables and uncontrollable conditions that may exist at individual installations. It is recommended that inlet and outlet water tests be conducted at individual installations to determine the water quality. Test information may indicate that a site specific absorbent material should be used.

In the normal use, the housing 11 should be periodically cleaned of sediment and debris by vacuum or by simply lifting out housing 11 assembly and dumping the sediment into an approved area or landfill. Check unit regularly and clean when dry in summer to minimize weight. Similarly, the absorber cartridge 20 should be changed, during summer, on at least a 1 to 2 year basis depending on the exposure to contaminants and sediment. Periodic inspections and tests can help determine practical change out schedule. Catch basin Inserts 10 located near new construction require more frequent inspection and cleaning.

Storm drains and catch basins are usually 18" to 24" in diameter or rectangular with 16"×24" or larger grates. Often they are 4' to 6' deep or more. They may be of any number of sizes, shapes and types. The catch basin Insert 10 acts as an interceptor and becomes a practical location to treat the first-flush rainwater.

The water decontamination apparatus in accordance with the present invention is suitable for most standard sizes, shapes and types of existing catch basins and grates and will fit into new and most existing catch basins with ease. In addition this apparatus is low in cost, has a long life, as well as being practical, efficient and easy to service. These features will encourage cities, businesses and others to use this simple, low cost and effective water treatment device.

The water decontamination in accordance of present invention is an engineered treatment system specifically designed for removing sediment, hydrocarbons and chemicals from the first flush of storm water run-off while allowing simple installation and easy service at low cost. In addition the apparatus is designed to be fail-safe, so when the storm rate increases, beyond the capacity of the cartridge flow rate, the excess water will simply overflow 44 and by-pass the housing 11. The lower the flow rates through the apparatus, the higher the filtration and hydrocarbon and chemical absorption efficiency. At very low flow rates the runoff water will flow through a lower section of activated carbon 22 filtration. Approximately 0.72 cubic foot of absorption media 22, 23, 24, 25 is used for filtration and to capture oil in the standard cartridge 20.

The following flow and filtration performance describes an improvement where low flow rates encounter more restrictive, higher efficient absorbing material than higher flow rates The following listing of relative flow rates is provided to indicate changes in operation of the system in accordance with the present invention with different flow rates:

- no-flow mode: The unit cartridge 20 dries out and is always ready for receiving any type flow or illegal dumping such as used motor oil.

- 0 to 5 gpm: (First flush period). During very low periods of flow, as may occur during summer rains or irrigation of lawns or hosing down driveways. The water level in the housing may only rise approximately 6". The low flow rate urban drain water may pass through a layer of (Polypropylene) filter/absorbent 24 material and or a layer of Activated Carbon 22 located near the bottom of the cartridge 20. This continues until eventually, the lower level of absorbent material becomes plugged and the level of water rises to the cleaner coarser absorbent 24, 25 above.

- 5 to 20 gpm. (First flush period). As the flow rate continues to climb up to approximately 20 gpm (the nominal clean flow rate of the cartridge 20) the water continues to be treated by the coarser (Absorbent W) material 25 along with the other lower layers of absorbent 24, 23, 22. This continues until the cartridge becomes saturated with hydrocarbons, sediment and other pollutants. The flow rate capacity decreases as the absorber cartridge 20 becomes plugged.

- 20 gpm to 100 gpm and higher storm flow conditions: (Storm flow periods). During high or full flow conditions the excess water, beyond the flow rate capacity through the cartridge 20, simply overflows the housing flange 11 and continues flowing without reducing incoming flow rate. It should be noted that most of the roadway oil and grease has already been washed away from the earlier first flush rains.

Numerous other size cartridges, housings 11 and frames 15 may be constructed in accordance with the present invention. Accessories and options may include a leaf strainer 30 or pre-strainer, sediment liner 33 in the housing 11, suction cleaning tube 31 with clod-buster bar 32, other site specific absorber materials or contamination destroying microbes 55, neutralizing chemicals 56 and sampling pot 57 under treated drain outlet at the axial extremity of the pipe 14. (The sampling plot 57 will be understood to be a receptacle for collecting a sample to be used for analysis to establish effectivity of the system in accordance for present invention.

For certain industrial and military sites where site specific absorbents need to be selected a modified absorber cartridge may be provided with an access opening in the top portion of the outer strainer 21 material for accessing, inspecting, or changing the absorbent material to suit the contaminating chemical on the site. More activated carbon 22 can be added to the primary media where a higher degree of chemical removal efficiency is required. Custom made units with site specific absorbents can also be provided. The unique slip-on cartridge 20 design allows for easy change-out.

The substantial improvements of the present apparatus and method over the prior art results in lower costs, faster installation, greater flexibility, improved sediment holding capacity, higher oil and chemical capture efficiency, greater flow rates and easier service.

Periodic maintenance should include inspections, sediment and debris removal from unit housing (during dry summer periods when dry). Allow for several inspections during the year. This includes cleaning leaves and debris at leaf pre-strainer and near grate entry especially after main leaf fall.

Replacement of filter/absorber cartridge yearly or as needed. The sediment in the housing 12 may need to be removed more frequently near new construction. This includes removal of the absorber cartridge 20 and installation of new absorber cartridge 20. Disposal of spent cartridges, in quantity, may be made at an incineration plant or landfill. Note: Certain conditions apply to disposal facilities, including standard road hydrocarbon type contaminants and certain minimum delivery charges to disposal site.

The decontamination apparatus 10 is a durable unit that can operate in almost any environment. The unit's large filter/absorber cartridge continues removing hydrocarbons and certain chemicals whenever flow occurs. The cleaner the water entering the unit the longer it will last. Special precautions are required at construction sites where there may be exposure to cement, plaster, paint, construction materials, landscaping debris, dirt and equipment wash-down should be prevented from entering the catch basin. Temporary barriers, screens and filters should be used by the contractor. Frequent inspection and street sweeping will facilitate long cartridge life. During Fall and Winter, when leaves are falling, it is important to increase the frequency of leaf removal to extend the life of the catch basin decontamination apparatus 10. Grass clipping and landscape material should also be kept out of the catch basin. Over irrigation can lead to un-necessary run-off from landscaping and may include unwanted lawn chemicals.

The water that enters a catch basin or dry-well may mix with the ambient groundwater or water ways and will thus affect the community and the environment of the community. The object of catch basin inserts is to help remove contaminants before they pollute the ambient groundwater and the rest of the environment.

The invention will be better understood by reference to the following more detailed description. The housing 11 is a heavy duty HDPE housing supported with a stainless steel support frame system. A water deflector shall be provided under the grate to direct entering drain water into the housing. A flow through filter/absorber cartridge with internal perforated drain tube can slip over a permanent perforated drain tube fixed to the bottom of the housing. The cartridge shall contain oil absorbent materials and activated carbon. Pre-strainers for leaf and debris control shall be provided at each of the various types of catch basin inlets.

The filter/absorber cartridge 20 contains a combination of oil and chemical absorbing materials including:

Absorbent "W": Particulate/cellulose based sorbents: designed to control hydrocarbons (oil based liquids) while repelling water. Absorbs liquids within fibers. Absorbs hydrocarbon liquids, oily sheens, tramp oils and other oil based liquids while repelling water. 100% organic—environmentally friendly, Green Cross certified. This material, approximately 0.3 cubic feet, shall be located in the upper portion of the cartridge.

Polypropylene Oil-Only Sorbents repel water—Fine Fiber absorbs up to 12 times its weight in liquids. Absorbs fuel oil, gasoline, benzene, organic solvents, and other hydrocarbons. This material, approximately 0.4 cubic feet, is located in the middle and lower portion of the cartridge in this preferred embodiment.

Activated Carbon—Washed to reduce fines. Absorbs a broad rang of chemicals and hydrocarbons. This material, at least 2 pounds, shall be located in the lower portion of the cartridge. Note: This material encounters the greatest pollution concentrations during very low flow rates.

Other absorbent materials and improvements may also be provided. A broad range of microbes 55 and neutralizing chemicals 56 are continually being developed and improved for treating run-off water and many of these can be added for certain applications.

Filter/absorber cartridge 20 has in a preferred embodiment a nominal 10" diameter by 18" height with inside drain tube, containing approximately 1,243 cubic inches of various absorbent material as noted above. The outer surface is covered with polyethylene strainer with a 70% fabric mesh.

It is preferred that the apparatus 10 include very low drain rate provisions whereby if the filter/absorber cartridge 20 become plugged the provisions minimize standing water above and below the absorber cartridge. For example, small weep holes 26A are located above the absorber material. In addition, a foam or poly pad under the cartridge allows for slow draining through small holes or openings in the bottom of the housing 11. This bypass runoff water occurs at a very low rate and prevents standing water that can be a habitat for mosquitoes.

Because the substances in wet catch basins are corrosive the structure of the present invention preferably includes substantial use of stainless steel and polyethylene to ensure long life. The housing support angle shall be $1\frac{1}{2}"\times 1\frac{1}{2}"\times\frac{3}{16}"$ thick type 304 stainless steel. Support chains, fasteners, brackets and other support items shall be stainless steel. The water deflector shall be formed to suit grate and housing inlet. Molded plastic and or fabricated stainless steel angle frame and HDPE liner material under grate shall direct drain water to housing. Large overflow area between housing and grate allow for a high rate of water flow by-pass during heavy rainfall. Leaf pre-strainers shall be provided for catch basins and side inlet drains. Site specific absorbent media may be provided in replaceable cartridges. The cartridge 20 typically holds approximately 0.72 cubic feet of absorbent materials.

The target contaminants to be removed by the apparatus in accordance with the present invention include petroleum hydrocarbons, sediment, trash, debris and chemicals.

Features:

Filter/absorber cartridge shall be easily removable for change-out.

Pre-strainers for leaf and debris shall be easily cleanable.

Sediment housing shall be easily removable without removing structural system.

High density polyethylene (HDPE) sediment housing shall be at least 16 gallons nominal capacity.

Filter/absorber cartridge shall be suitable for incineration and or landfill disposal.

Very low flow rates should encounter the lower level activated carbon.

Referring now to FIGS. 8A-8D there is shown a second embodiment of the present invention. This embodiment of the decontamination apparatus is primarily above ground and thus will be referred to as an above ground decontamination apparatus 110. Large sites, such as shipping ports near a bay, with a common outflow are also practical applications for above ground decontamination units. Such systems can widely vary in size by simply adding more cartridges 20 to the above ground open tanks as shown in FIGS. 8A-8D. It will be understood that the cartridges 20 may be identical to the cartridges 20 used in the first embodiment. This modular approach leads to the economies of scale in the manufacturing process and economies for the user because the necessity for stocking multiple unique parts is minimized.

The decontamination apparatus 110, as indicated above is used to treat the rainwater from an existing large site such as a shipping port that has a number of drains and catch basins without inserts that drain to a common outflow pipe to a bay.

1. Runoff water 42 from the site includes contaminates from paved area flows down the drains to an outflow pipe 50.
2. The outflow pipe 50 leads to the bay where the water is normally discharged.
3. The apparatus of the present embodiment includes an interceptor tank or containment tank 44 that collects the runoff water 42. A float activated sump pump 47 is sized for a flow rate consistent with the capacity of the plurality of cartridges 20 disposed in a containment tank 44. The pump 47 directs the runoff water 42 to the containment tank 44.
4. The runoff water 42 builds up to a certain level in the containment tank 44 and flows through each of a plurality of slip-on filter/absorber cartridges 20.
5. The treated water then exits the housing and drains back to the bay where it is discharged.

If the filter/absorber cartridges 20 become dirty and plugged the water level in the containment tank 44 will rise until the dirty water 42 enters the overflow pipe 14 and perforated cap 27 in the center of each cartridge 20.

Other similar embodiments of the present invention may be used to clean ponds, and other contaminated water sources as may be found in cleaning up the water from a building after a fire. This dirty fire water contains all types of contaminants including transformer oil, paints, and all sorts of chemicals and ash. Capturing this dirty water and treating it before it enters the nearby catch basins will help keep the pollutants out of the groundwater.

The catch basin decontamination apparatus 10 is placed under the grate 36 to intercept and treat the early low flow run-off. Each unit is furnished with the following:

❑Support System: Universal stainless steel angle ring 15 that accepts housing 11 assembly. The angle ring 15 is supported to the catch basin frame 37 with stainless steel chains 16 with length to suit the conditions. This allows for one housing 11 type to fit almost any shape drain grate frame 37.

❑Water deflector 29: Molded or formed plastic- directs incoming water from grate 36 into the housing 11. The deflector 29 may have a lightweight support frame with polyethylene sheeting or be pre-molded out of various plastics.

❑Housing 11—A HDPE open top, tapered tank captures the incoming run-off and allows for sediment and heavy solids to settle. The top of the tank has a broad rim or flange 12 that acts as a stop when the housing 11 slips into the support angle ring 15. Drain water builds up elevation head in the housing 11 and that increases flow rate through the filter/absorber cartridge 20.

❑Slip-on Filter/Absorber Cartridge 20—Provides for straining and filtering of solids along with deep bed filtration loading to minimize plugging up or being blinded by fines. The absorber media absorbs hydrocarbons, including oils and greases, antifreeze and many other chemicals and contaminants. During low flow rates all the drain water flows through a fairly uniform thickness of absorbent material.

❑Overflow 44—A large overflow 44 area allows for heavy rains to simply by-pass and overflow the housing 11. This area extends above the flange 12 of the housing 11 and the deflector 29.

Figure 7:
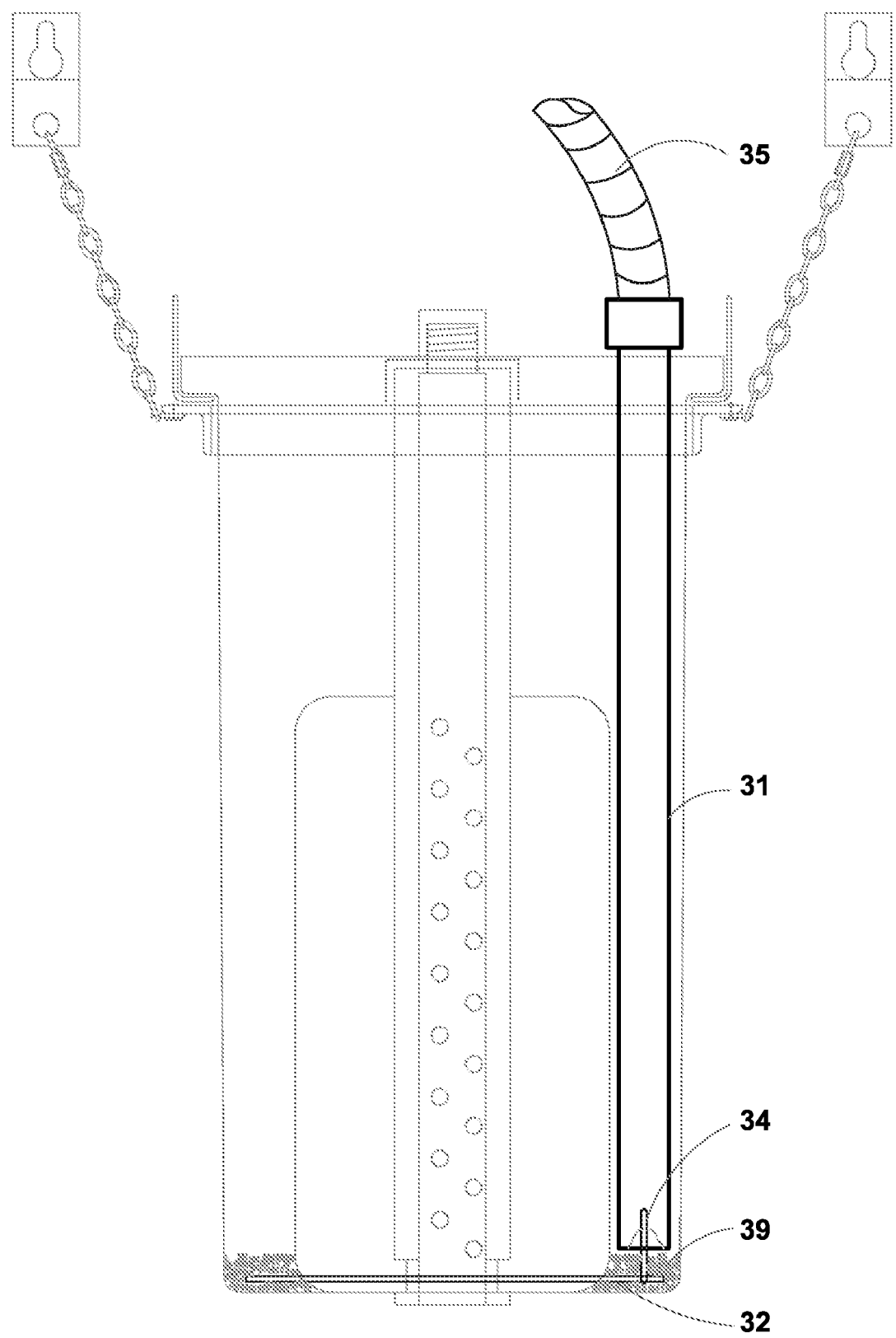
FIG. 7 is a schematic view of an optional "clean in place" feature.
Figure 8A:
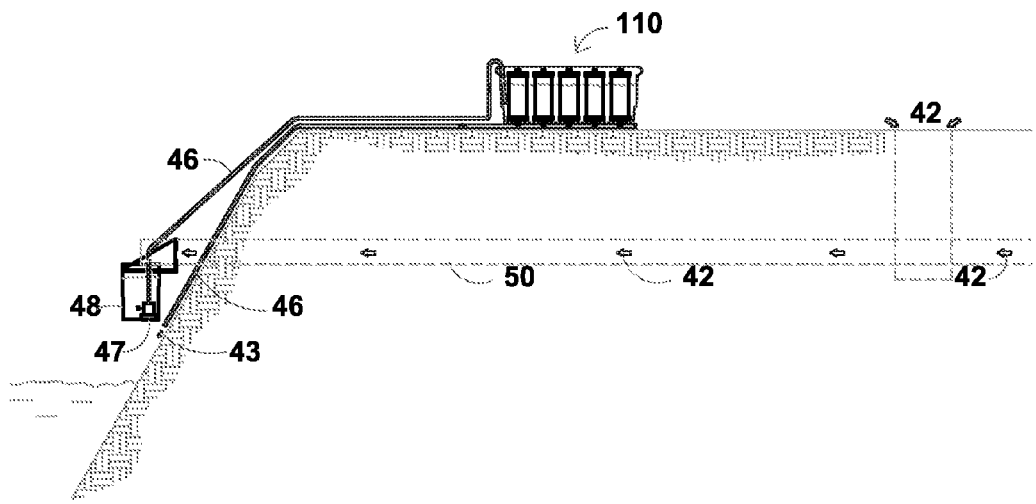
FIG. 8A is a schematic view of a second embodiment of the present invention, primarily installed above ground, illustrating multiple filter/absorber cartridges in an open tank that communicates with and decontaminates the effluent from a large site that has multiple catch basins (having no decontamination apparatus) and which typically drain into a body of water (such as a bay) or a land mass.
Figure 8B:
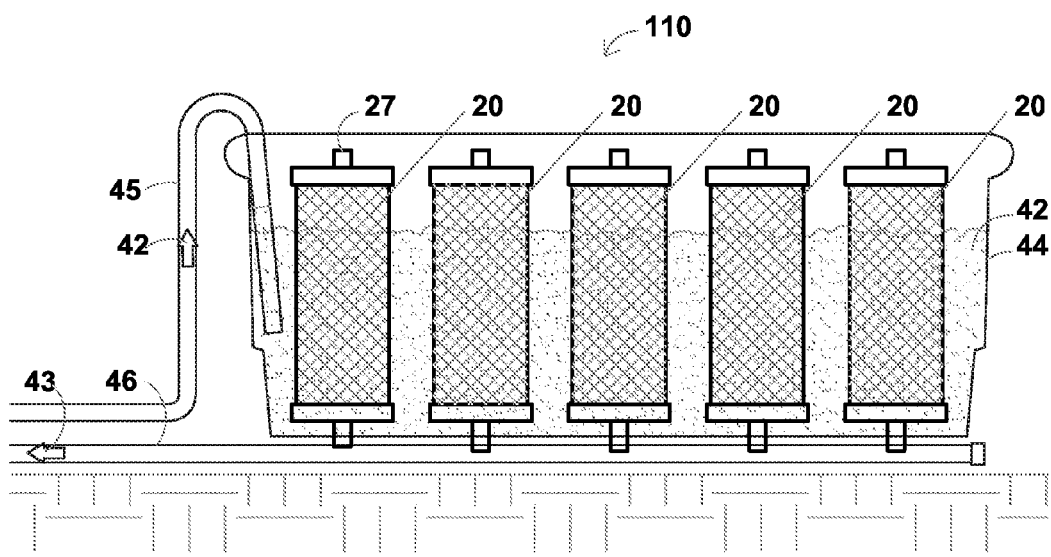
FIG. 8B is a more detailed schematic view of the open tank and multiple cartridges in the second embodiment.
Figure 8C:
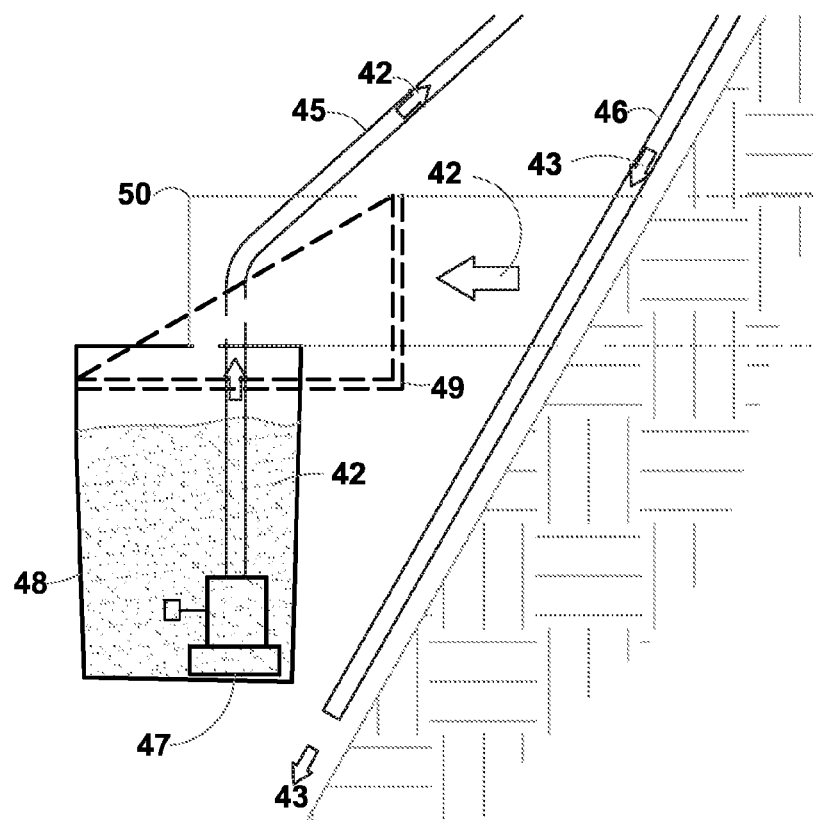
FIG. 8C is a more detailed schematic view of the interceptor sump portion of the second embodiment.
Figure 8D:
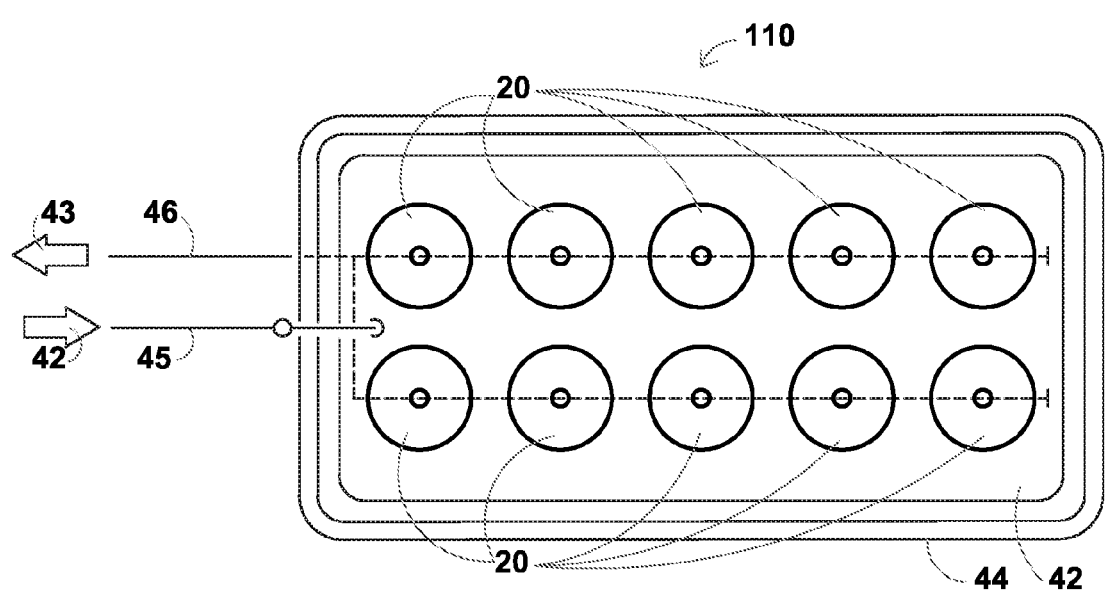
FIG. 8D is a more detailed schematic top view of the multiple cartridges in an open tank.

Referring now to FIG. 7 there is shown a combination suction tube and clod buster ring 32 at the bottom of the housing. A vacuum hose 35 from a street sweeper may connect to the suction tube 31 and the tube can then be moved up and down. A clip attachment 34 between the bottom of the suction tube 31 and the clod buster ring 32 will break up any sediment clumps that solidify when they sit for long periods of time. The tube 31 is moved up and down and all around the bottom of the housing 11 until it is clean. The clod buster ring 32 is ordinarily a rigid pipe. When it is time to clean the housing 11 of sediment, a vacuum hose is connected to the top of the suction tube 31. The rigid suction tube 31 can then be moved up and down manually to break up the clumped sediment. The sediment then flows up the suction tube to a municipal vacuum truck.

Unique Features of the Water Decontaminator that are a substantial improvement over prior art as follows.

1. Universal Support System: The slip in stainless steel angle ring supported by SS chains can fit in almost any size or shape catch basin. The SS chains allow infinite adjustment to suit any size or shape basin. Suspended housings can be supported and leveled to any height with 3 chains. Side inlet basins where the housing rests against the side of the basin can be supported with 2 chains. This design completely eliminates the need to fabricate custom sheet metal adapters that fit under the grate. Prior art supports involve detailed field measurements, special brackets, custom made frames and result in complex expensive systems.
2. Housing assembly: The HDPE open tank with top flange allows tank to easily slip into angle ring with ease. The tank flange acts as a positive stop and built in lifting brackets allow housing to be removed with a winch if heavily loaded with sediment.
3. Perforated riser drain tube: A 2" nominal pipe size perforated plastic pipe extends from and through the bottom of the housing to the top flange of the housing. This may be molded with the tank or attached with fittings to make the riser tube a permanent integral part of the housing assembly. A male pipe thread or attachment device 27 is located on top of the 2" fixed tube 14.
4. Slip-On Filter/Absorber Cartridge: The cartridge includes a 3" diameter perforated drain tube covered with a strainer fabric over the perforations. A cylindrical filter sock 10" diameter by 18" long filled with various absorber materials surrounds the lower portion of the 3" drain tube 26. This allows the cartridge 20 to simply slip over the permanent 2" riser drain tube 14. A screw on fitting 27 with flange locks the cartridge in place during use.
5. Optional Leaf Pre-Strainer: This strainer 30 is designed to help prevent leaves, grasses and debris from entering the housing 11. Cut-outs in the strainer allow for drain water to bypass the strainer should it become plugged. The strainer may be located under the grate or recessed at the inlet of side inlet type catch basins. This allows the pre-strainer to not be damaged by street sweepers or other roadway traffic.

6. Optional internal vacuum cleaning tube 31: This acts to dislodge sediment 39 on bottom of housing and allow for "Clean-In-Place" operation with a normal vacuum as on a street sweeper. The top of the tube 31 is located above the housing and can be connected to a flex hose 35 to a vacuum for cleaning. This feature allows the housing to be easily and quickly cleaned of sediment without removing the housing assembly. This keeps service costs down and insures a clean housing at the start of each winter rain season.
7. The filter/absorber cartridge 20 contains a variety of absorber materials. Activated carbon 22 occupies a portion of the bottom or lower portion of the cartridge. Should the illegal dumping of small quantities of oil or chemicals occur it would encounter the activated carbon that is most effective in absorbing chemicals and hydrocarbons. Located above this layer is polypropylene 24 as manufactured, for example, by Spilfyer. NSP Corporation, 3303 Sprial Way, Green Bay, Wis. 54304. This material is made with fine fibers for high quality absorption of oil. This material repels water. The upper layer is a cellulose based particulate absorbent material 25 as made by Absorbent "W". It allows for the greater flow rate of all the other absorbent materials in the cartridge. This helps insure the lower flow rates encounter the highest performance filtration and oil and chemical capture. All these absorbents tend to lock onto the oils once captured.
8. Optional microbe 55 and chemical 56 additions: The use of microbes in water treatment has been gaining in popularity in recent years. Many types of microbes are now available that could be easily added to the absorber cartridge. For example, microbes that attack nitrates can be added to the absorber materials. These are naturally occurring microbes in nature but concentrated dry pellets could be added to the cartridge. These microbes attach themselves to nitrates and may pass into the storm drain system piping. The slow acting microbes can break down the harmful nitrates into harmless chemicals and gas.
9. Optional housing cleaning feature: A unique polyethylene suction tube 31 extends from the top to bottom of the housing. It is connected to a clod buster bar 32 that traverses the bottom to allow for "Clean-in Place" of the sediment with the vacuum attachment as on a street sweeper. This feature allows the sediment and debris to be easily removed without removing the housing. An attachment clip 34 between the tube 31 and bar 32 allows the tube be moved up and down and all around the bottom of the housing to break up and solidified sediment. Then the broken down clumps of sediment can be vacuumed. Keeping the sediment level low greatly extends the filter/absorber cartridge life.
10. Optional sediment strainer liner 33: A fabric strainer liner can also be added that allows for the sediment, sludge, and debris to be removed without removing the housing. With the slip-on filter/absorber cartridge removed, the strainer liner can easily be removed along with the contained sediment and discarded. A new sediment strainer liner can then be installed along with a new filter/absorber cartridge. The liner can drape over top of the housing flange 12.

The 16 gallon HDPE housing 11 can become very heavy if it becomes full of sediment. The empty housing alone is very light and weights about 8 pounds. It is advantageous to keep the level of sediment from building up in the bottom of the housing because it starts to block the filter cartridge 20 and shorten its life. Therefore, frequent inspection and cleaning keeps the units effective and can extend cartridge life. Once the housing fills with sediment it looses its ability to help keep sediment out of the storm drain system. The heavy sediment filled housing will then require a winch to remove it from the slip ring. Then the cartridge can be removed and the housing inverted to empty the sediment. A new filter/absorber cartridge can then be installed and the housing placed back in service.

Where catch basin Inserts are located near new construction areas a large amount of sediment and construction materials can enter the housing. These inserts need more frequent inspection and cleaning. The cartridges 20 in these Inserts may include a looser fill of absorber 24,25 media for greater deep bed loading since filtration becomes the primary problem during construction. Later, as construction work is completed and sediment control is maintained, the cartridge may be changed to a more efficient oil capture type.

Advantages of this present invention include: The catch basin decontamination apparatus 10 can be installed in almost any size, shape or type catch basin unit. Each installation can use the same standardized housing, support ring, and filter/absorber cartridge. The only different components needed will be the water deflector to suit the various grate sizes and the length of the chains to support the housing ring and the pre-strainer. This keeps inventory simple, replacement cartridges uniform and allows for quick practical service.

the term "runoff water" as used herein will be understood to mean water that may be contaminated with contaminants.

The description herein refers to stainless steel chains 16. Those skilled in the art will recognize suspension apparatus may also be utilized without departing from the spirit of the invention. For example, the elongated nylon or other plastic materials may also be utilized as well as cables and wires or even rigid bars. More specifically, a rigid bar with, for example a hook at each end can engage a bracket on the wall of the catch basin and a bracket on the top of the decontamination apparatus 10. Some embodiments may utilize only one suspension member because the geometry of the catch basin and the decontamination apparatus 10 may sufficiently locate the decontamination apparatus 10 laterally as well as otherwise with respect to the catch basin. Some embodiments may even utilize a single suspension member that extends vertically from a mounting that is directly above the decontamination apparatus 10. (For example, one or more L-shaped brackets mounted on the sidewall of the catch basin may engage the suspension members.) Still other variations within the scope of the present invention will be apparent to those skilled in the art.

The support for the housing 11 may be multiple chains or other support members. Some embodiments utilize three suspension members disposed at 120 degree increments about the ring or collar 15. Varying the length of the suspension members ensures that the ring 15 is level. It does not matter if the grate and frame is round, rectangular or square. For side inlet type catch basins only two chains will commonly be utilized. This structure allows for substantial simplification of installation. The housing 11 can then be slipped into the ring 15 for support. The standpipe 14 with perforations is an integral part of the housing 11. In mass produced embodiments the housing 11 and the standpipe 14 are molded in one piece. In other embodiments standpipe 14 is attached to the bottom of the housing 11 as shown in the drawings. The slip-on filter/absorber cartridge 20 includes a lightweight tube 26 extending through the center of the cartridge that is of larger inside diameter than the outside diameter of the standpipe 14 in the housing (typically a loose fit or greater with, for example, a 0.5 inch radial clearance). This clearance allows the cartridge 20 to be easily replaced when dirty by simply lifting the dirty cartridge off the standpipe and slipping on a new clean cartridge back over the standpipe 14. The cartridge 20 includes the absorbent materials with a strainer covering.

The present invention includes the features of a collar or support ring 15 that supports the housing 12 and allows easy replacement and maintenance of the apparatus. Another major feature of the present invention is that the standpipe or drain tube 14 facilitates easy removal of the slip-on filter/absorber cartridge 20 and provides a compact and functional structure that directs cleaned runoff water out of the apparatus.

DESCRIPTION AND IDENTIFICATION
NUMBERS OF ALL ELEMENTS

10. First embodiment—catch basin decontamination apparatus
11. Housing High Density Polyethylene HDPE. Nominal 16 gallon capacity.
12. Top flange of housing.
13. Lift support brackets (2) attached to top flange of housing.
14. Perforated 2" drain tube or standpipe fixed to housing.
15. Stainless steel angle support ring that housing slips into for support.
16. Stainless steel chains that support angle ring and attach to catch basin frame.
17. Fastener securing chain to angle ring.
18. Bracket securing top of chain to catch basin frame support.
19. Quick-Link connecting chain to support clip.
20. Slip-on Filter/Absorber Cartridge.
21. Polyethylene fabric covering cartridge and internal perforated drain tube.
22. Activated carbon absorber material in fine fabric circular tube sock.
23. Polyester or polypropylene fiber under activated carbon sock.
24. Polypropylene fine fibers for deep bed filtration and hydrocarbon absorbent.
25. Cellulose based sorbents (Absorbent "W") particulate for absorbing oils.
26. Perforated 3" internal drain tube in cartridge.
27. Screw on cap to lock cartridge in place.
28. Foam pad or polyester mat at bottom of housing under cartridge.
29. Deflector, formed to suit grate opening size and direct water to housing inlet.
30. Leaf pre-strainer.
31. Suction cleaning tube.
32. Clod buster bar or ring.
33. Optional sediment strainer liner.
34. Attachment clip between Suction tube and clod buster bar.
35. Flex hose to vacuum on street sweeper.
36. Grate of existing catch basin, nominal size 24"×16".
37. Frame support of existing catch basin.
38. Large 24" diameter concrete drain pipe of existing catch basin.
39. Sediment at bottom of housing.
40. Oil, grease and other hydrocarbons.
41. Gravel, rocks and heavy debris.
42. Dirty water before treatment.
43. Treated water (after leaving filter/absorber cartridge).
44. Containment tank—above ground with supports for cartridges.
45. Pumped dirty water piping to containment tank.
46. Treated drain water piping from containment tank.
47. Sump pump with automatic float control. Pumps water to containment tank.
48. Interceptor sump tank that holds collected outflow water.
49. Support for sump tank and sump pump.
50. Outflow pipe that collects untreated drain water from a large area.
51. New or existing catch basin.
52. Gutter.
53. Highway or road.
54. Curb.
55. Contamination destroying microbes.
56. Neutralizing chemicals.
57. Sampling pot. Suspended below 2" drain tube 14 for water test purposes.
110 Second embodiment—above ground large site decontamination apparatus Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A filtration apparatus for mounting in an associated catch basin for receiving associated runoff water which comprises:
    a housing, said housing having a top and a bottom, said bottom having an outlet for discharging a liquid;
    at least a first suspension member having a first axial extremity for attaching to a wall of the associated catch basin and a second axial extremity for attaching to said housing;
    a filtration media disposed in said housing and disposed to cause liquid in said housing to pass through said filtration media before passing out of said outlet;
    said housing having an overflow that allows passage of liquid entering said housing, at a rate that is greater than a predetermined rate, to bypass said filtration media wherein said filtration media includes one or more absorbents, said apparatus further includes a deflector for directing associated runoff water into said housing and further including an agitation member for shaking said filtration media.

2. A filtration apparatus as described in claim 1 said agitation member includes a tube connected to an associated vacuum device to clear clods.

3. A filtration apparatus as described in claim 2 wherein said tube is dimensioned and configured for receiving pneumatic pressure from a highway service truck.

4. A filtration apparatus for mounting in an associated catch basin for receiving associated runoff water which comprises:
 a housing, said housing having a top and a bottom, said bottom having an outlet for discharging a liquid;
 at least a first suspension member having a first axial extremity for attaching to a wall of the associated catch basin and a second axial extremity for attaching to said housing;
 a filtration media disposed in said housing and disposed to cause liquid in said housing to pass through said filtration media before passing out of said outlet;
 said housing having an overflow that allows passage of liquid entering said housing, at a rate that is greater than a predetermined rate, to bypass said filtration media wherein said filtration media includes one or more absorbents, said apparatus further includes a deflector for directing associated runoff water into said housing and wherein said filtration media is disposed in a cartridge having a central bore.

5. A filtration apparatus as described in claim 4 wherein said cartridge includes a centrally disposed tube.

6. A filtration apparatus is describing claim 5 wherein said centrally disposed tube having at least a part thereof is perforate.

7. A filtration apparatus for decontaminating runoff water from a plurality of catch basins which comprises:
 an interceptor tank to collect the runoff water;
 a containment tank for treatment of runoff water, a plurality of modular filter/absorber cartridge assemblies disposed in said containment tank;
 a float operated sump pump disposed in said interceptor tank for directing runoff water from said interceptor tank to said containment tank; and
 a drain conduit extending from said containment tank to discharge treated runoff water.

8. The filtration apparatus as described in claim 7 wherein the outlets of each of said modular filter/absorber cartridges communicate with said drain conduit.

9. A filtration apparatus for mounting in an associated catch basin for receiving associated runoff water which comprises:
 a housing, said housing having an inside and an outside and a top and a bottom;
 an elongated perforate standpipe having an inside and an outside and a first axial extremity and a second axial extremity and a plurality of openings therein disposed along the axial extent, said standpipe being mounted in said housing with a fluid tight connection between the second axial extremity of said standpipe and said bottom of said housing with the interior of said standpipe in fluid communication with the outside of said housing and each of said plurality of openings therein disposed along the axial extent of said standpipe providing a plurality of fluid communication paths between said inside of said housing and said inside of said standpipe;
 a filtration media disposed in said housing proximate to an axial portion of said standpipe, said filtration media being dimensioned and configured to filter the associated runoff passing through said plurality of fluid communication paths
 said filtration media comprising a plurality of horizontally layered absorbent materials, each layer in the said plurality of horizontally layered materials having a unique composition, respective layers being disposed in aligned relationship with respective fluid communication paths whereby the filtration media characteristics at respective fluid communication paths will be different.

10. A filtration apparatus as described in claim 9 wherein the layer of said plurality of horizontally layered materials closest to said bottom of said housing provides greater removal of sediment and hydrocarbons than any other layers.

11. A filtration apparatus as described in claim 9 wherein the layer of said plurality of horizontally layered materials closest to said bottom of said housing is activated carbon.

12. A filtration apparatus as described in claim 9 wherein the layer of said plurality of horizontally layered materials closest to said bottom of said housing is polypropylene.

13. A filtration apparatus as described in claim 9 wherein the layer of said plurality of horizontally layered materials closest to said bottom of said housing provides greater removal of sediment and hydrocarbons than any other layer.

14. A filtration apparatus as described in claim 9 wherein the layer of said plurality of horizontally layered materials closest to said bottom of said housing provides allow a lower flow rate than any other layer.

15. A filtration apparatus as described in claim 9 wherein the layer of said plurality of horizontally layered materials furthest from said bottom of said housing allows Ia higher flow rate than any other layer.

16. A filtration apparatus as described in claim 9 wherein respective layers of said plurality of horizontally layered materials that are successively higher above said bottom of said housing allow successively higher flow rates
 said housing having an overflow that allows passage of liquid entering said housing, at a rate that is greater than a predetermined rate, to bypass said filtration media.

17. A filtration apparatus as described in claim 9 further including a deflector for directing associated runoff water into said housing.

18. A filtration apparatus as described in claim 9 further including:
 an agitation member for shaking said filtration media.

19. A filtration apparatus as described in claim 18 said agitation member includes a tube connected to an associated vacuum device to clear clods.

20. A filtration apparatus as described in claim 19 wherein said tube is dimensioned and configured for receiving pneumatic pressure from a highway service truck.

21. A filtration apparatus as described in claim 9 wherein said apparatus is dimensioned and configured to prolong the passage of fluid through said housing to allow sediment and debris to settle to the bottom of said housing.

22. A filtration apparatus as described in claim 9 wherein at least one of the upper layers of said plurality of horizontally layered absorbent materials is a cellulose based sorbent.

23. A filtration apparatus as described in claim 9 wherein at least one of said layers of said plurality of horizontally layered absorbent materials is polypropylene.

24. A filtration apparatus as described in claim 9 wherein at least one of said layers of said plurality of horizontally layered absorbent materials is activated carbon.

25. A filtration apparatus at described in claim 9 wherein a layer of said plurality of horizontally layered absorbent materials near the bottom of said housing is activated carbon.

26. A filtration apparatus as described in claim 9 wherein said filtration media is disposed in a cartridge having a central bore.

27. A filtration apparatus as described in claim 9 wherein said filtration media is disposed in a cartridge includes a centrally disposed tube.

28. A filtration apparatus as described in claim 27 wherein said centrally disposed tube has at least a part thereof that is perforate.

29. A filtration apparatus as describing claim 27 wherein said centrally disposed tube has at least a part thereof that is perforate and said centrally disposed tube is dimensioned for concentric spaced placement with respect to said elongated perforate standpipe.

30. A filtration apparatus for mounting in an associated catch basin for receiving associated runoff water as described in claim 9 wherein:
said filtration media is disposed in a modular cartridge.

31. A filtration apparatus for mounting in an associated catch basin for receiving associated runoff water as described in claim 30 wherein:
said cartridge surrounds said standpipe.

32. A filtration apparatus for mounting in an associated catch basin for receiving associated runoff water as described in claim 31 wherein:
said cartridge is substantially cylindrical and has a center bore that is substantially concentric with said standpipe.

33. A filtration apparatus for mounting in an associated catch basin for receiving associated runoff water as described in claim 32 wherein:
said cartridge is substantially cylindrical and has a center bore that is substantially concentric with said standpipe.

34. A filtration apparatus for mounting in an associated catch basin for receiving associated runoff water as described in claim 33 wherein:
said cartridge further includes a perforate substantially cylindrical member in said center bore that is substantially concentric with said standpipe.

35. A filtration apparatus for mounting in an associated catch basin for receiving associated runoff water as described in claim 34 wherein:
said substantially cylindrical member is dimensioned and configured for spaced concentric relationship with said standpipe.

36. A filtration apparatus for mounting in an associated catch basin for receiving associated runoff water as described in claim 34 wherein:
said perforate substantially cylindrical member includes an axial section proximate to said filtration media that is perforate.

37. A filtration apparatus for mounting in an associated catch basin for receiving associated runoff water as described in claim 30 wherein:
said modular cartridge is secured by a fastener on the top thereof and said housing has an open top whereby replacement of said modular cartridge is accessible from the top of the associated catch basin through said open top.

38. A filtration apparatus for mounting in an associated catch basin for receiving associated runoff water as described in claim 9 wherein:
said apparatus includes bypass runoff openings to prevent the collection of water to avoid providing a habitat for mosquitoes.

39. A filtration apparatus for mounting in an associated catch basin for receiving associated runoff water as described in claim 9 wherein:
said apparatus includes a sock enclosing said filtration media.

* * * * *